United States Patent Office 2,832,753
Patented Apr. 29, 1958

2,832,753

RUBBER STABILIZED WITH AN AMINE AND A TIN COMPOUND

Elliott L. Weinberg, Long Island City, N. Y., and Louis A. Tomka, deceased, late of Westfield, N. J., by Irene E. Tomka, executrix, Westfield, N. J., assignors to Metal & Thermit Corporation, New York, N. Y., a corporation of New Jersey No Drawing. Application March 11, 1955
Serial No. 493,836

27 Claims. (Cl. 260—45.75)

This invention relates to improvements in inhibitors for ozone degradation of rubber and similar vulcanizable elastomers and to rubber compositions containing the same.

An object of the present invention is to provide a composition for preventing and inhibiting the damage to rubber and elastomers caused by their exposure to ozone and ozone-like substances. Atmospheric ozone has been shown by many investigators to be the main factor in deterioration of stressed rubber items such as tires, weatherstrips, wire and hose exposed to the weather. (See article by Shaw et al. in "Rubber World," August 1954, pp. 636–642.) The damage caused by such exposure normally manifests itself as either slight or deep surface cracking. Such cracking of the surface of a rubber composition leads to eventual physical failure of the article.

Broadly, this invention comprises the incorporation of two types of ingredients into a rubber or elastomer formulation. The first ingredient, designated as, "A" is an organotin compound from the class defined by the formula:

$$R_nSnQ$$

wherein R is a radical selected from the class consisting of substituted or unsubstituted alkyl, aryl, aralkyl and alkaryl radicals, wherein when more than one R is present they may be the same or different, Q is a radical selected from the class consisting of =X, ≡(XXH), and —XSnR$_n$ wherein X may be oxygen, sulfur, selenium and tellurium and wherein n is 1 when Q is ≡(XXH), n is 2 when Q is =X, and n is 3 when Q is —XSnR$_n$. In this formula, the groups defined by R and X are bonded to tin.

By way of illustration, the following organotin compounds, that are used in the present invention, may be mentioned:

Phenyl stannonic acid, methyl stannonic acid, butyl stannonic acid, benzyl stannonic acid, diphenyltin sulfide, dimethyltin sulfide, dibutyltin sulfide, diphanyltin selenide, dimethyltin selenide, dibutyltin selenide, triphenyltin sulfide, trimethyltin sulfide, tributyltin sulfide, triphenyltin selenide, trimethyltin selenide, tributyltin selenide, methyldiselenostannonic acid, phenylditellurostannonic acid, butyldithiostannonic acid, dimethyltin oxide, dibutyltin oxide, diphenyltin oxide, diphenyltin telluride, dimethyltin telluride, dibutyltin telluride, tributyltin oxide, trimethyltin oxide, triphenyltin oxide, triphenyltin telluride, trimethyltin telluride and tributyltin telluride.

In addition to the alkyl and aryltin compounds described above, various alkaryl and aralkyl organotin oxides, sulfides, selenides, tellurides and stannonic acids are operative as ingredients according to the present invention.

The second ingredient that is incorporated in the rubber or elastomeric formulation according to the present invention, and designated as "B," are amines, preferably secondary amines and particularly secondary aryl amines. These include generally, but are not restricted to: N,N'-di-alkyl (or aryl) p-phenylenediamines, bis-alkyl (or aryl) polyalkylenediamines, alkyl or aryl naphthylamines, alkyl arylamines, and diarylamines. Such secondary amines may also be of the form of ring-closed secondary amines such as dihydroquinolines. One or more of these amines either singly or in combination are used according to the teachings of this invention.

More particularly the following secondary amines are used in the present invention:

N,N' dibutyl-p-phenylene diamine, N,N' diphenyl-p-phenylene diamine, N,N' dioctyl-p-phenylene diamine, N,N' dinaphthyl-p-phenylene diamine, phenyl α naphthylamine, phenyl β naphthylamine, di-p-methoxydiphenylamine, 6-ethoxy-1,2-dihydro-2,2,4-trimethylquinoline, and 1,2-dihydro-2,2,4-trimethyl-6-phenyl quinoline.

Secondary amines, such as described as ingredient "B," have been known to be useful in rubber compositions as antioxidants. While these amines are also known to furnish some antiozonant action, the extent of this protection is small and inadequate as compared with the composition of this invention.

Organotin compounds have also been known to furnish antioxidant protection as shown in pending applications Serial Nos. 359,199; 407,151; 407,152; 407,153; 407,154; 407,155; 407,156; 407,157; 421,688; and 430,970, assigned to the assignee of the present application. The combination of a type of organotin compound with secondary amines have been shown to be superior as an antioxidant in U. S. Patent No. 2,476,661. However, organotin compounds, particularly of the type R''$_4$Sn have shown little or no antiozonant activity with or without a secondary amine, the R'' in this formula being alkyl, aryl, alkaryl, aralkyl where the four R'' groups are the same or different. Other organotin compounds of this type have shown only slight antiozonant activity. The extent of this activity is illustrated in the table below.

The behavior of the rubber composition incorporating both ingredients "A" and "B," according to the present invention, is unexpected in that the protection from ozone degradation is superior to that afforded by the individual components used at any level, and is superior to the sum of the protection afforded by the individual components. It is, likewise, superior to any other system known to the applicants.

The ozone degradation inhibitor compositions of the present invention are added to natural and synthetic rubbers or other vulcanizable elastomers and rubber containing compositions. Specifically there may be mentioned the rubbery materials of the class consisting of (a) natural rubber, (b) rubber-like copolymers of 1,3 butadiene and styrene (GR-S type) and (c) rubber-like copolymers of 1,3 butadiene and acrylonitrile (nitrile type).

The antiozonant composition of the present invention is added to the rubbery materials defined above in any suitable manner. Preferably it is milled with the rubbery material. Other rubber additives such as the normal filler, extenders, accelerators, antioxidants and curing agents may be added to the rubbery composition during compounding.

One or more of the ingredients designated above as "A," i. e., the organotin compounds, may be present in the rubber composition, according to the present invention, in an amount in the range of from 0.045% to 5% by weight and preferably in the range of 0.2% to 3% by weight. For optimum performance ingredient "A" should be present in an amount within the range of 0.3% to 0.6% by weight. One or more of the ingredients designated above as "B," i. e., the secondary amines, may be present in the rubber composition according to this invention in an amount in the range of 0.03% to 2.5% by weight and preferably in the range of 0.1% to 1.5% by weight. For optimum results the rubber composition according to the present invention should contain ingredients "B" in the range of 0.2% to 0.3% by weight.

The percentage by weight as expressed above and when used elsewhere herein is based on the weight of the rubbery material in the composition.

The following specific examples are illustrative of the present invention. However, it is to be understood that this invention is not restricted thereto.

Typical rubber compositions to which the antiozonants of the present invention are added are as follows:

BASE FORMULATION I

| | Pts. by wt. |
|---|---|
| GR-S-1500 [1] | 100 |
| Channel black | 50 |
| Zinc oxide | 3 |
| Stearic acid | 2 |
| N-cyclohexyl-2-benzothiazolesulfeneamide | |
| Sulfur | 1.75 |

[1] Described in "Sales Catalogue GR-S and GR-1 Type Synthetic Rubber," p. 1500-1; October 15, 1952, Reconstruction Finance Corporation, Office of Synthetic Rubber.

BASE FORMULATION II

| | Pts. by wt. |
|---|---|
| Pale crepe | 100 |
| Channel black | 50 |
| Zinc oxide | 5 |
| Stearic acid | 3 |
| Benzothiazyl disulfide | 1 |
| Sulfur | 3 |
| Zinc dimethyl dithiocarbonate | 0.1 |

To these base formulations I, II were added the additives designated in the examples listed below. The compositions were then milled and cured according to ASTM D-15-52T using 20 minute cures.

As used in the following examples, "p. h. r." signifies parts per hundred parts of rubber.

Example 1—Base formulation I without any anti-ozonant
Example 2—Base formulation II without any anti-ozonant
Example 3—Base formulation I+1.6 (p. h. r.), N,N' di-sec-butyl-p-phenylene diamine
Example 4—Base formulation II+1.6 (p. h. r.), N,N' di-sec-butyl-p-phenylene diamine
Example 5—Base formulation II+0.4 (p. h. r.) dibutyltin sulfide
Example 6—Base formulation II+1 (p. h. r.) tribenzylmonobutyltin
Example 7—Base formulation II+1 (p. h. r.) polymerized 1,2 dihydro, 2,2,4 trimethyl quinoline
Example 8—Base formulation II+1 (p. h. r.) phenyl β naphthylamine
Example 9—Base formulation II+1 (p. h. r.) tribenzylmonobutyltin+1 (p. h. r.) N,N' di-sec-butyl-p-phenylene diamine
Example 10—Base formulation I+1.6 (p. h. r.) N,N' di-sec-butyl-p-phenylene diamine+0.4 (p. h. r.) dibutyltin sulfide.
Example 11—Base formulation II+1.6 (p. h. r.) N,N' di-sec-butyl-p-phenylene diamine+0.4 (p. h. r.) dibutyltin sulfide
Example 12—Base formulation II+1 (p. h. r.) polymerized 1,2 di-hydro 2,2,4 trimethyl quinoline+0.7 (p. h. r.) N,N' di-sec-butyl-p-phenylene diamine+0.3 (p. h. r.) dibutyltin sulfide
Example 13—Base formulation II+1 (p. h. r.) polymerized 1,2 di-hydro 2,2,4 trimethyl quinoline+1 (p. h. r.) phenyl β naphthylamine+0.7 (p. h. r.) N,N' di-sec-butyl-p-phenylene diamine+0.3 (p. h. r.) dibutyltin sulfide
Example 14—Base formulation II+1.6 (p. h. r.) N,N' dioctyl-p-phenylene diamine+0.4 (p. h. r.) dibutyltin sulfide
Example 15—Base formulation I+1.6 (p. h. r.) N,N' di-sec-butyl-p-phenylene diamine+0.4 (p. h. r.) dibutyltin sulfide+0.5 (p. h. r.) petroleum hydrocarbon wax
Example 16—Base formulation II+0.7 (p. h. r.) N,N' di-sec-butyl-p-phenylene diamine+0.3 (p. h. r.) dibutyltin sulfide+0.5 (p. h. r.) petroleum hydrocarbon wax
Example 17—Base formulation II+1.6 (p. h. r.) diphenyl propylene diamine+0.4 (p. h. r.) dibutyltin sulfide
Example 18—Base formulation I+1.6 (p. h. r.) N,N' dioctyl-p-phenylene diamine+0.4 (p. h. r.) dimethyltin sulfide
Example 19—Base formulation II+1.6 (p. h. r.) N,N' di-sec-butyl-p-phenylene diamine+0.4 (p. h. r.) diphenyltin sulfide The milled and cured rubber compositions of Examples 1 to 19 were subjected to the following ozone test procedure to determine the effectiveness of the additives as antiozonants:

*Description of ozone test procedure*

Bent loop specimens of rubber 1 inch by 6 inches were stapled to a card and placed on a turntable which was mounted in a box 1 cubic foot in volume. Two 4 watt ozone producing lamps were mounted in the box. The samples were caused to rotate and were under continued ozone exposure. Examination was made of the samples at hourly intervals. The reported data is at six hour intervals. Although we had no direct measure of the ozone concentration, it is felt that this concentration was greater than the normal 25 to 50 parts per million used in other ozone tests. It was likewise felt that this technique gave quite reproducible results.

Table I shows the results of the ozone tests described above when applied to the rubbery composition of Examples 1 to 19 supra. In this table the example number corresponds to the particular example of rubber composition, described above, which is employed in each test. Thus, for example, Example 1 of Table I indicates that the composition of Example 1 above, is employed in the ozone test described.

The criterion, for the effectiveness of the additives as antiozonants, is taken to be the degree of surface checking observed. No surface checking indicates good antiozonant properties. Severe surface checking indicates poor antiozonant properties. For purposes of comparison, compositions containing additives not included in the present invention, as well as rubbery compositions without additives, have been included in this table.

TABLE I.—RATING OF RUBBER SAMPLES EXPOSED TO OZONE

| Example | Hours | | | | |
|---|---|---|---|---|---|
| | 6 | 12 | 18 | 24 | 30 |
| 1 | 2 | 4 | 4 | 4 | break |
| 2 | 2 | 2 | 3 | 3 | 4 |
| 3 | 2 | 3 | 3 | 4 | 4 |
| 4 | 2 | 2 | 3 | 4 | 4 |
| 5 | 2 | 2 | 3 | 3 | 4 |
| 6 | 2 | 2 | 3 | 4 | 4 |
| 7 | 2 | 3 | 3 | 3 | 4 |
| 8 | 2 | 3 | 3 | 3 | 4 |
| 9 | 2 | 2 | 3 | 3 | 4 |
| 10 | 1 | 1 | 1 | 1 | 1 |
| 11 | 1 | 1 | 1 | 1 | 1 |
| 12 | 1 | 1 | 1 | 1 | 1 |
| 13 | 1 | 1 | 1 | 1 | 1 |
| 14 | 1 | 1 | 1 | 1 | 1 |
| 15 | 1 | 1 | 1 | 1 | 1 |
| 16 | 1 | 1 | 1 | 1 | 1 |
| 17 | 1 | 1 | 2 | 2 | 2 |
| 18 | 1 | 1 | 1 | 1 | 1 |
| 19 | 1 | 1 | 1 | 1 | 1 |

*Code identification*
1—No surface checking
2—Slight surface checking
3—Medium surface checking
4—Severe surface checking In place of the dibutyltin sulfide, diphenyltin sulfide and dimethyltin sulfide in the above examples, wherein a secondary amine is also employed, may be used the stannonic acids such as phenyl stannonic acid, methyl stannonic acid, butyl stannonic acid, methyl diselenostannonic acid, phenyl ditellurostannonic acid and butyl dithiostannonic acid. These sulfides may also be replaced by the oxides, selenides and tellurides, such as dimethyltin oxide, dibutyltin oxide and diphenyltin oxide, tributyltin oxide, trimethyltin oxide, triphenyltin oxide, diphenyltin selenide, dimethyltin selenide, dimethyltin selenide, dibutyltin selenide, diphenyltin telluride, dimethyltin telluride, dibutyltin telluride, triphenyltin selenide, trimethyltin selenide, tributyltin selenide, triphenyltin telluride, trimethyltin telluride and tributyltin telluride. Also, in place of these sulfides may be used triphenyltin sulfide, trimethyltin sulfide and tributyltin sulfide.

It is evident from the experimental data presented herein, that the antiozonant composition of the present invention affords extraordinary stability to rubbery compositions on exposure to ozone and ozone-like substances. This permits the production of rubber goods with superior storage and performance characteristics under conditions wherein these ozonizing ingredients are present.

While the invention has been described with reference to various samples and embodiments, it will be apparent to those skilled in the art that various modifications may be made without departing from the principles and true nature of the invention.

What is claimed is:

1. A composition comprising a sulphur vulcanizable rubbery polymer, secondary aromatic amine and organotin compound of general formula $$R_nSnQ$$

wherein R is a radical selected from the class consisting of alkyl, aryl, aralkyl and alkaryl radicals, $n$ is a positive integer from 1 to 3 inclusive, Q is a radical selected from the class consisting of $=X$, $\equiv(XXH)$ and $—XSnR_n$ wherein X is selected from the class consisting of oxygen, sulfur, selenium and tellurium and wherein $n$ is 1 when Q is $\equiv(XXH)$, $n$ is 2, when Q is $=X$, and $n$ is 3 when Q is $—XSnR_n$, the groups defined by X and R being bonded to tin.

2. A composition according to claim 1 wherein the secondary aromatic amines are aryl amines.

3. A composition according to claim 2 containing organotin compound in the range of about 0.045 to 5% by weight based on the rubbery material and secondary aromatic amine in the range of about 0.03 to 2.5% by weight based on the weight of the rubbery material.

4. A composition according to claim 2 containing organotin compound in the range of about 0.2 to 3% by weight based on the rubbery material and secondary aromatic amine in the range of about 0.1 to 1.5% by weight based on the rubbery material.

5. A composition according to claim 2 containing organotin compound in the range of about 0.3 to 0.6% by weight based on the rubbery material and secondary aromatic amine in the range of about 0.2 to 0.3% by weight based on the rubbery material.

6. A composition comprising a rubbery material selected from the class consisting of natural rubber, rubber-like copolymers of 1,3 butadiene and styrene and rubber-like copolymers of 1,3 butadiene and acrylonitrile, secondary aromatic amine selected from the class consisting of N,N'-di-alkyl-p phenylenediamines, N,N' di-aryl-p-phenylenediamines, bis-aryl polyalkylene diamines, alkyl naphthylamines, aryl naphthylamines, alkyl arylamines, diarylamines and ring closed secondary aromatic amines and organotin compound of general formula $$R_nSnQ$$

wherein R is a radical selected from the class consisting of alkyl, aryl, aralkyl and alkaryl radicals, $n$ is a positive integer from 1 to 3 inclusive, Q is a radiical selected from the class consisting of $=X$, $\equiv(XXH)$ and $—XSnR_n$ wherein X is selected from the class consisting of oxygen, sulfur, selenium and tellurium and wherein $n$ is 1 when Q is $\equiv(XXH)$, $n$ is 2 when Q is $=X$, and $n$ is 3 when Q is $—XSnR_n$, the groups defined by X and R being bonded to tin.

7. A composition according to claim 6 wherein R is alkyl.

8. A composition according to claim 7 containing organotin compound in the range of about 0.045 to 5% by weight based on the weight of the rubbery material and secondary aromatic amine in the range of about 0.03 to 2.5% by weight based on the weight of the rubbery material.

9. A composition according to claim 7 containing organotin compound in the range of about 0.2 to 3% by weight based on the rubbery material and secondary aromatic amine in the range of about 0.1 to 1.5% by weight based on the rubbery material.

10. A composition according to claim 7 containing organotin compound in the range of about 0.3 to 0.6% by weight based on the rubbery material and secondary aromatic amine in the range of about 0.2 to 0.3% based on the weight of the rubbery material.

11. A composition according to claim 6 wherein R is aryl.

12. A composition according to claim 11 containing organotin compound in the range of about 0.045 to 5% by weight based on the rubbery material and secondary aromatic amine in the range of about 0.03 to 2.5% by weight based on the rubbery material.

13. A composition according to claim 11 containing organotin compound in the range of about 0.2 to 3% by weight based on the rubbery material and secondary aromatic amine in the range of about 0.1 to 1.5% based on the rubbery material.

14. A composition according to claim 11 containing organotin compound in the range of about 0.3 to 0.6% by weight based on the rubbery material and secondary aromatic amine in the range of about 0.2 to 0.3% by weight based on the rubbery material.

15. A composition according to claim 6 wherein R is aralkyl.

16. A composition according to claim 15 containing organotin compound in the range of about 0.045 to 5% by weight based on the rubbery material and secondary aromatic amine in the range of about 0.03 to 2.5% by weight based on the rubbery material.

17. A composition according to claim 15 containing organotin compound in the range of about 0.2 to 3% by weight based on the rubbery material and secondary aromatic amine in the range of about 0.1 to 1.5% by weight based on the rubbery material.

18. A composition according to claim 15 containing organotin compound in the range of 0.3 to 0.6% by weight based on the rubbery material and secondary aromatic amine in the range of about 0.2 to 0.3% by weight based on the rubbery material.

19. A composition according to claim 6 wherein R is alkaryl.

20. A composition according to claim 19 containing organotin compound in the range of about 0.045 to 5% by weight based on the rubbery material and secondary aromatic amine in the range of about 0.1 to 1.5% by weight based on the rubbery material.

21. A composition according to claim 19 containing organotin compound in the range of 0.3 to 0.6% by weight based on the rubbery material and secondary aromatic amine in the range of about 0.2 to 0.3% by weight based on the rubbery material.

22. A composition according to claim 7, wherein the organotin compound is dibutyltinsulfide.

23. A composition according to claim 7, wherein the organotin compound is dimethyltinsulfide.

24. A composition according to claim 11, wherein the organotin compound is diphenyltinsulfide.

25. A composition according to claim 1, wherein the organotin compound is a hydrocarbontin sulfide.

26. A composition according to claim 6, wherein the organotin compound is a hydrocarbontin sulfide.

27. A composition according to claim 1 wherein the secondary aromatic amine is a ring-closed secondary amine the amine nitrogen constituting part of a heterocyclic ring.

References Cited in the file of this patent

UNITED STATES PATENTS

| | | |
|---|---|---|
| 2,310,449 | Lightbown et al. | Feb. 9, 1943 |
| 2,476,661 | Hart | July 19, 1949 |